US010017167B2

(12) United States Patent
Han

(10) Patent No.: US 10,017,167 B2
(45) Date of Patent: Jul. 10, 2018

(54) DEVICE AND METHOD FOR BRAKING AND VEHICLE USING SAME

(71) Applicant: Seung Woo Han, Incheon (KR)

(72) Inventor: Seung Woo Han, Incheon (KR)

( * ) Notice: Subject to any disclaimer, the term of this patent is extended or adjusted under 35 U.S.C. 154(b) by 59 days.

(21) Appl. No.: 14/914,904

(22) PCT Filed: Aug. 28, 2014

(86) PCT No.: PCT/KR2014/007997
§ 371 (c)(1),
(2) Date: Feb. 26, 2016

(87) PCT Pub. No.: WO2015/030490
PCT Pub. Date: Mar. 5, 2015

(65) Prior Publication Data
US 2016/0200305 A1    Jul. 14, 2016

(30) Foreign Application Priority Data

Aug. 28, 2013 (KR) .......................... 10-2013-0102383
Aug. 28, 2014 (KR) .......................... 10-2014-0112985

(51) Int. Cl.
*B60T 13/22* (2006.01)
*B60T 13/38* (2006.01)
*B60T 13/66* (2006.01)
*B60T 13/68* (2006.01)

(52) U.S. Cl.
CPC ............ *B60T 13/22* (2013.01); *B60T 13/385* (2013.01); *B60T 13/662* (2013.01); *B60T 13/686* (2013.01)

(58) Field of Classification Search
None
See application file for complete search history.

(56) References Cited

U.S. PATENT DOCUMENTS 3,802,746 A * 4/1974 Walser .................. B60T 13/141
                                                    188/170
3,917,037 A * 11/1975 Prillinger ................ B60T 13/22
                                                    188/170
3,924,902 A * 12/1975 Engle ...................... B60L 3/108
                                                    303/132
3,929,381 A * 12/1975 Durling ................. B60T 13/263
                                                    303/118.1

(Continued)

FOREIGN PATENT DOCUMENTS

JP       06-067237 U     9/1994
JP       2001-158342 A   6/2001

(Continued)

OTHER PUBLICATIONS

International Search Report for PCT/KR2014/007997.

*Primary Examiner* — Thomas J Williams
*Assistant Examiner* — James K Hsiao

(57) ABSTRACT

The present invention relates to a device and a method for braking, and a vehicle comprising the same. The present invention has an effect of easily releasing a braking force of a parking brake by switching between a first state, in which first and second lines of a service brake are connected and first and second lines of the parking brake are connected, and a second state, in which the first line of the service brake and the second line of the parking brake are connected.

30 Claims, 13 Drawing Sheets

(56) References Cited

U.S. PATENT DOCUMENTS

| | | | |
|---|---|---|---|
| 6,669,307 B1* | 12/2003 | Vollmer | B60T 13/265 303/9.66 |
| 2001/0050027 A1* | 12/2001 | Engle | B61H 13/005 105/238.1 |
| 2003/0015116 A1* | 1/2003 | Engle | B61D 3/187 105/238.1 |
| 2005/0146208 A1* | 7/2005 | Wattenburg | B60R 25/00 303/70 |
| 2008/0202871 A1* | 8/2008 | Battistella | B60T 13/24 188/170 |
| 2010/0206677 A1* | 8/2010 | Shiraki | B60T 13/741 188/325 |
| 2014/0374199 A1* | 12/2014 | Minoshima | B60T 7/12 188/163 |

FOREIGN PATENT DOCUMENTS

| | | |
|---|---|---|
| JP | 2004-217009 A | 8/2004 |
| KR | 20-2000-0019497 U | 11/2000 |
| KR | 10-2010-0121393 A | 11/2010 |

\* cited by examiner

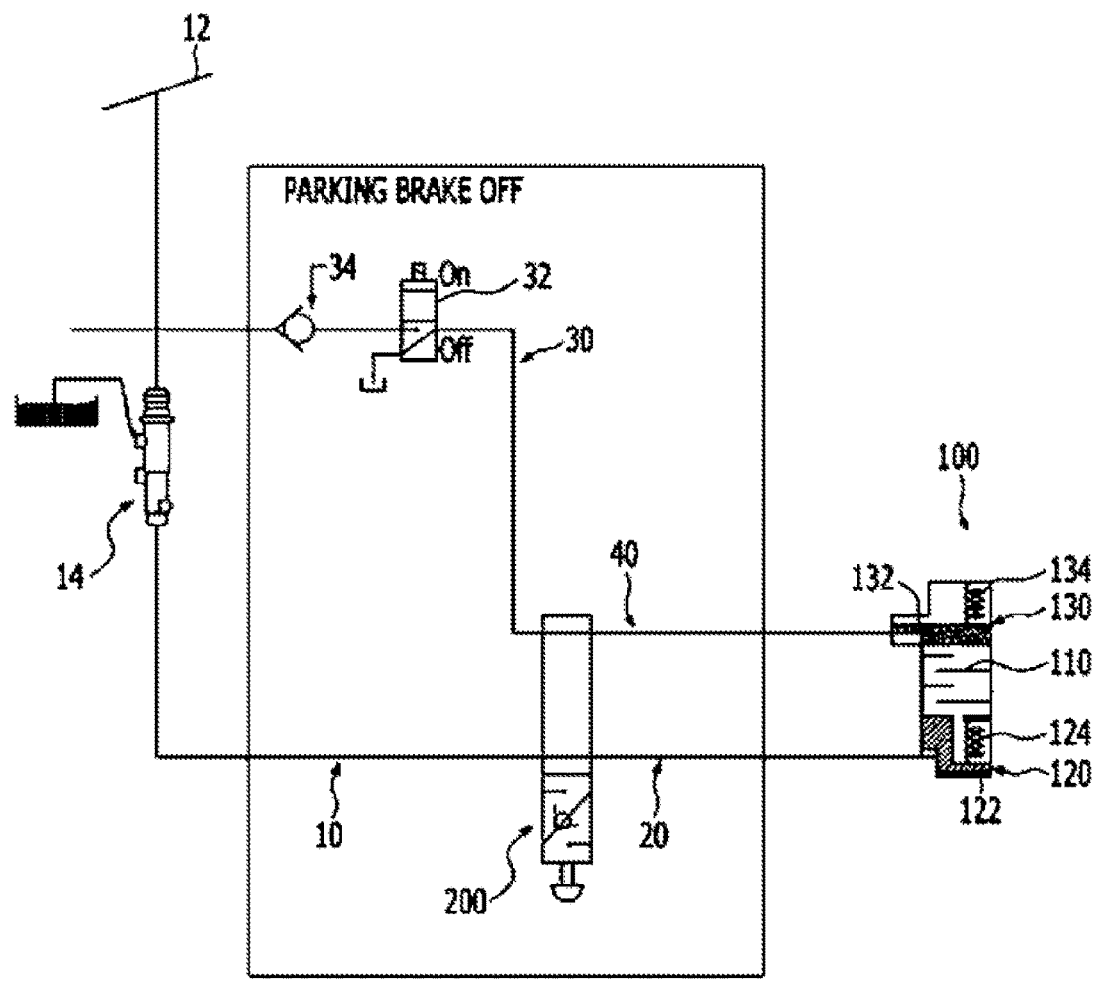
[Fig 1]

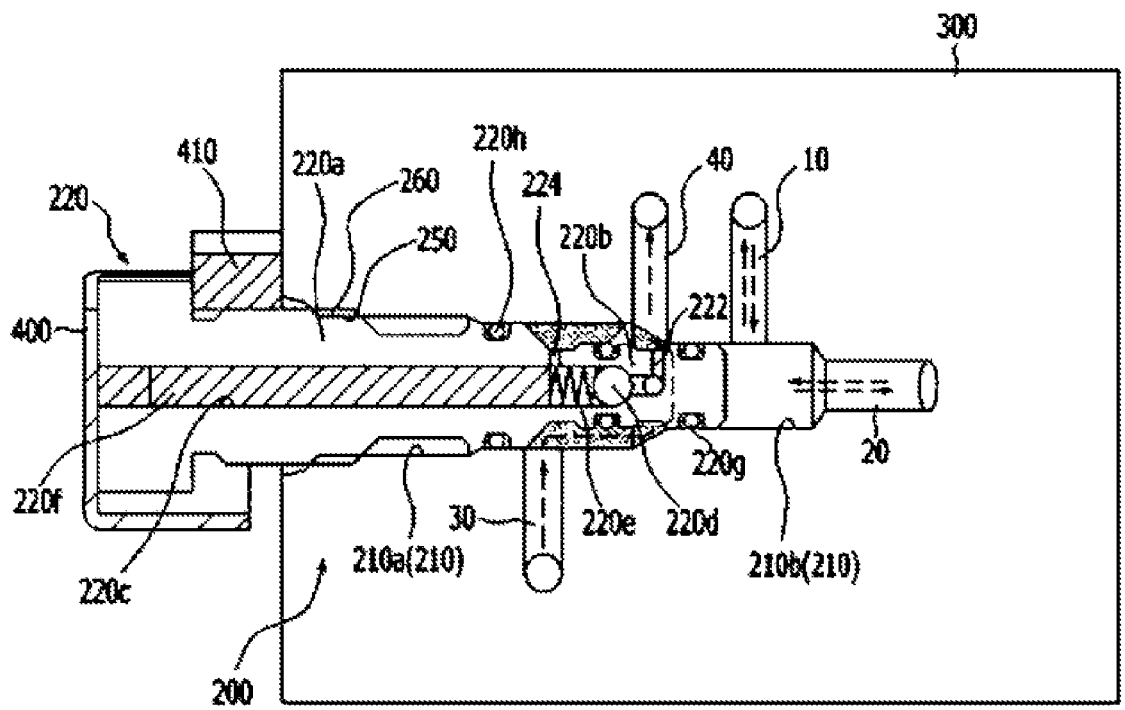
[Fig 2]

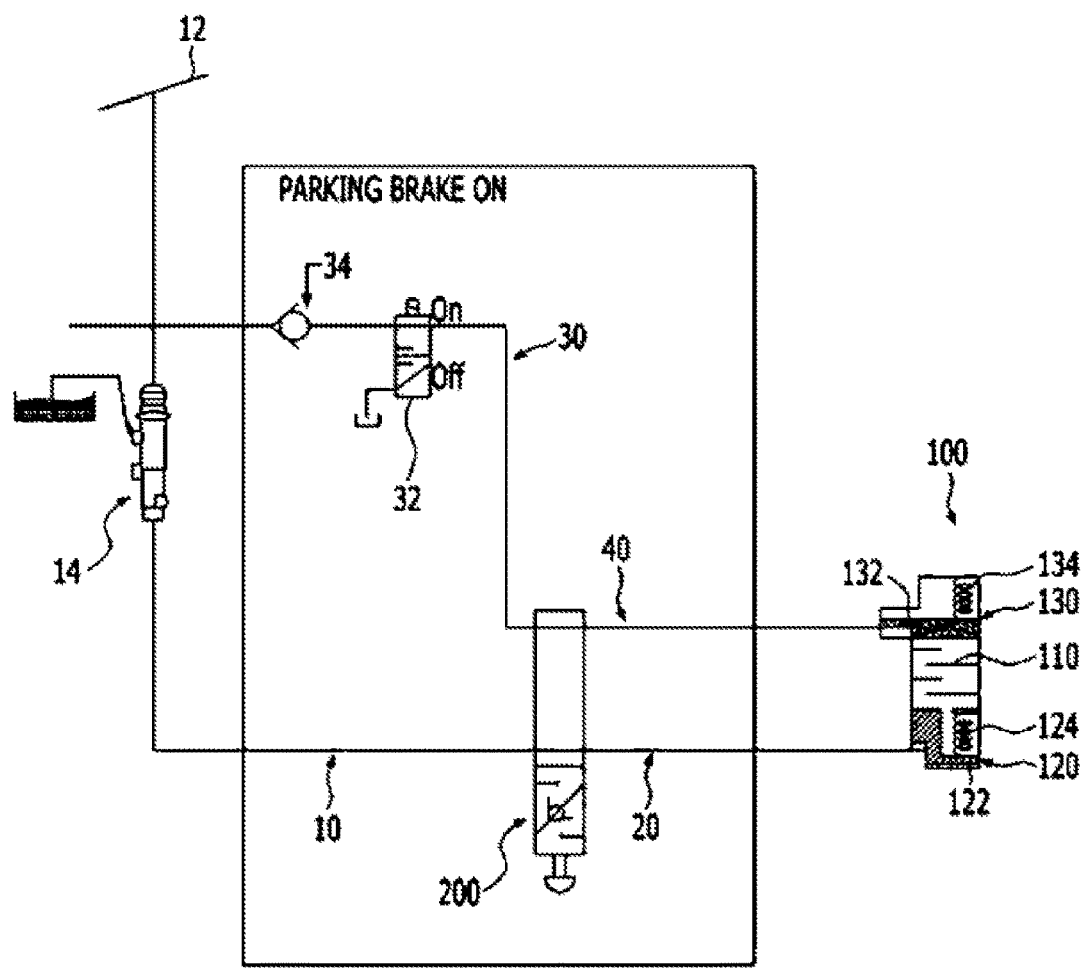

[Fig 4]
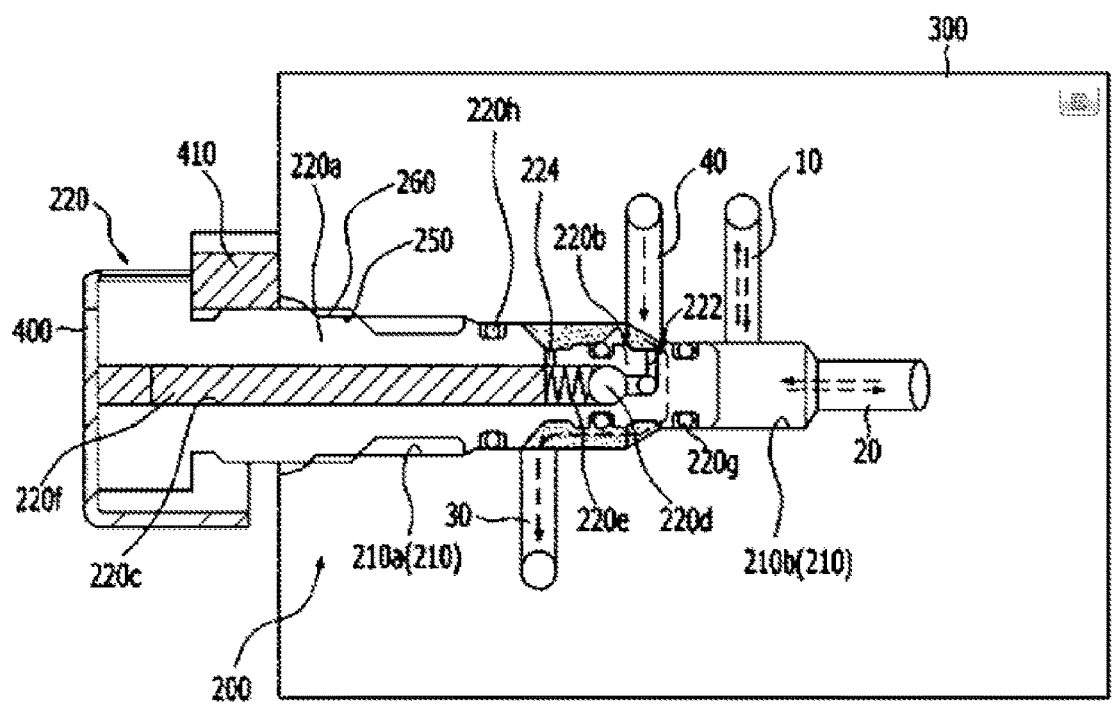

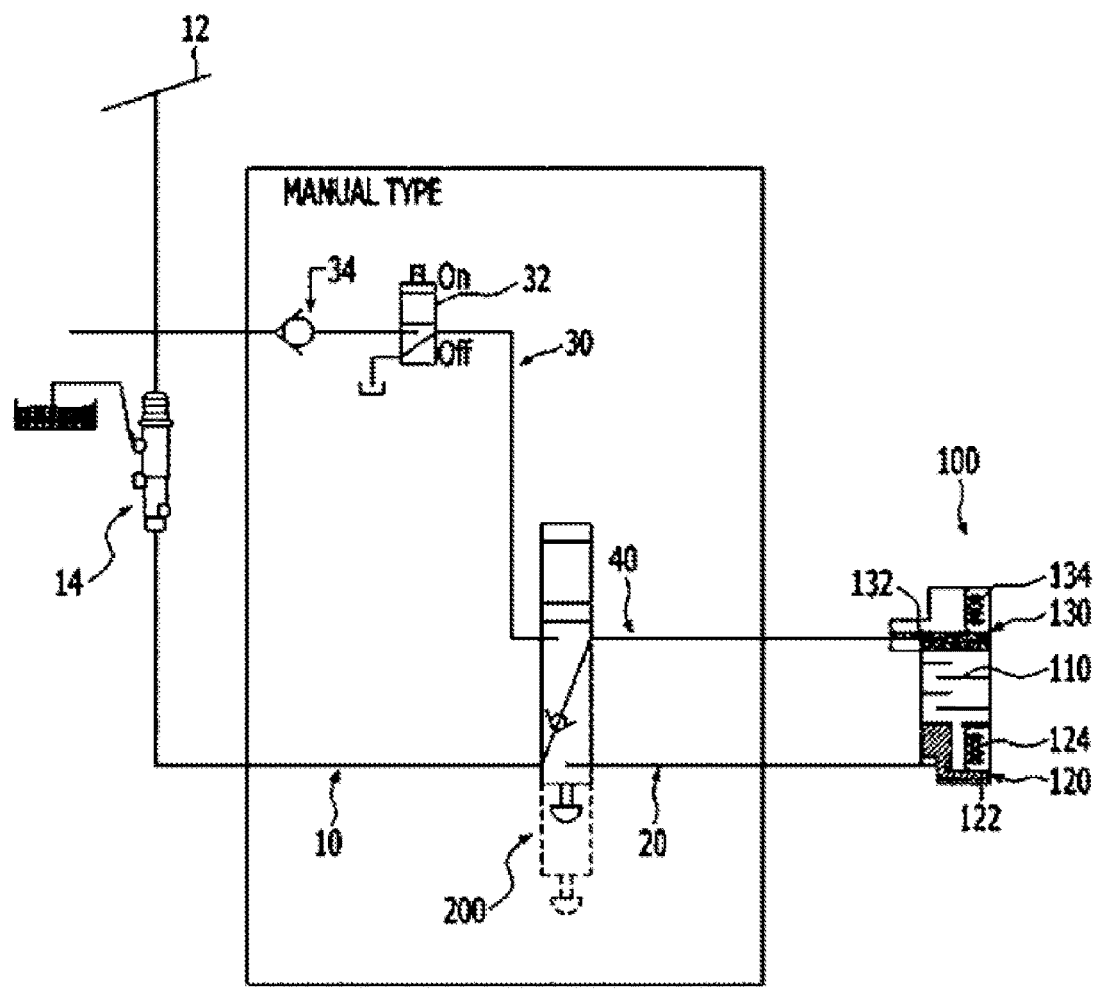
[Fig 5]

[Fig 6]
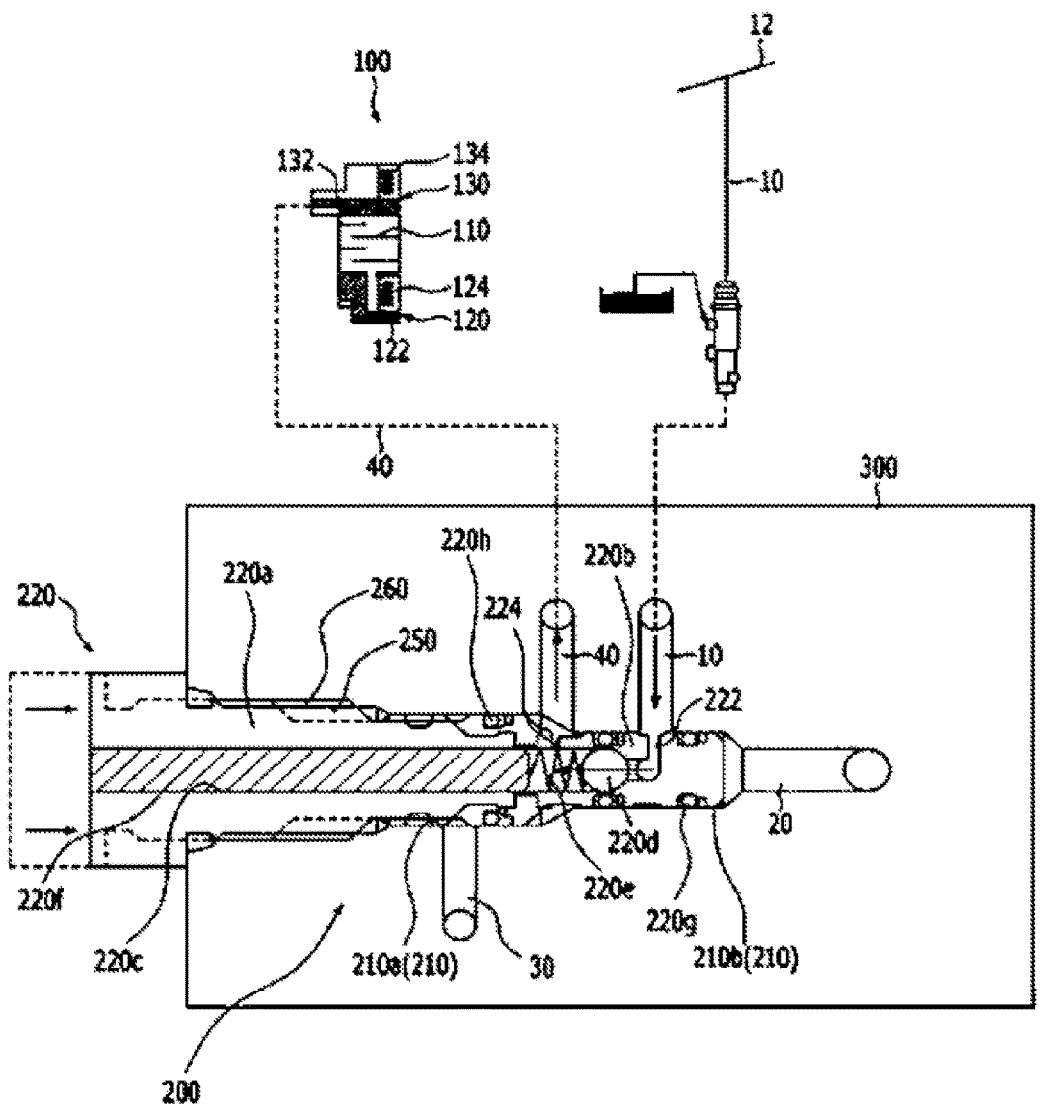

[Fig 7]
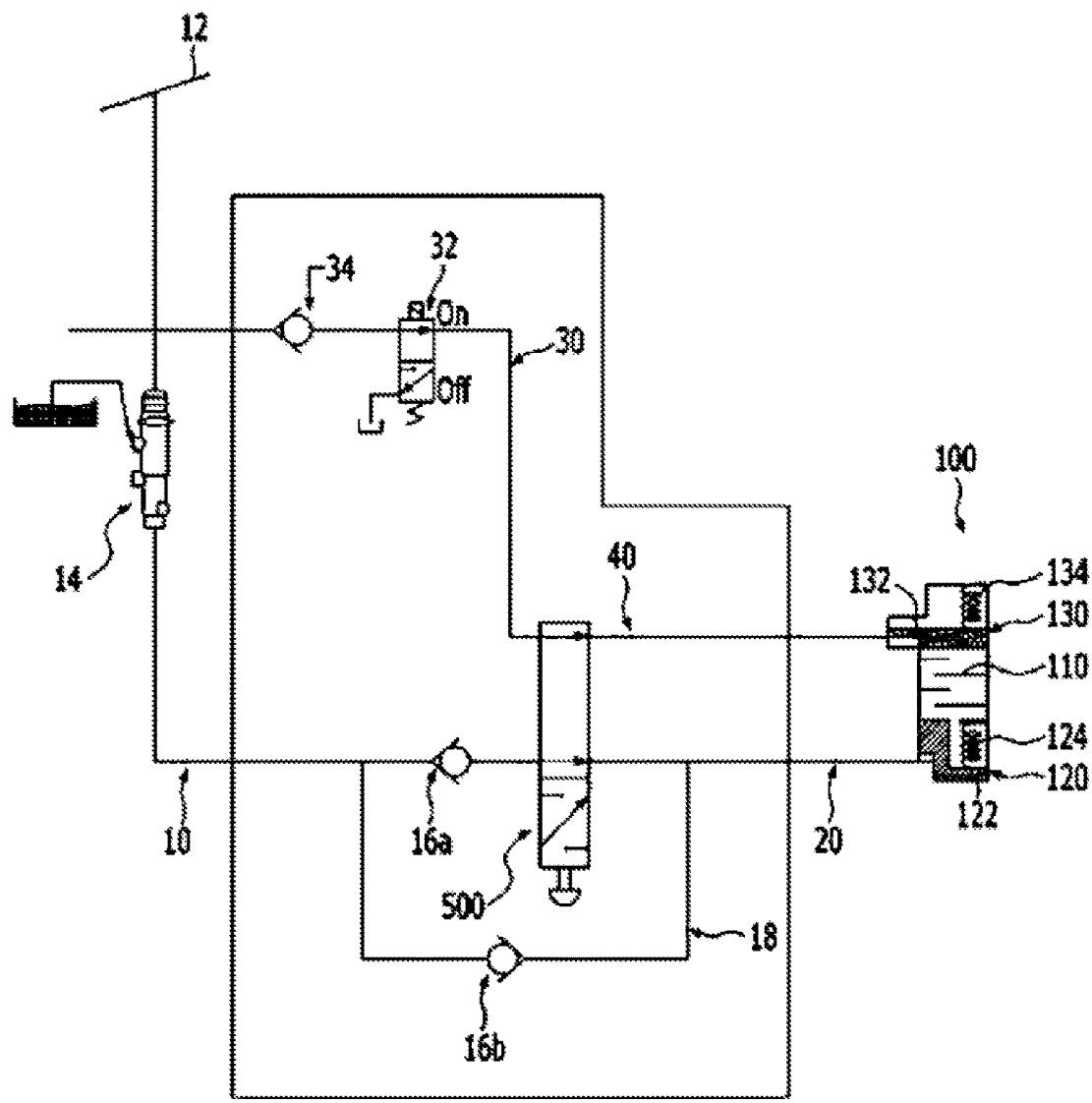

[Fig 8]
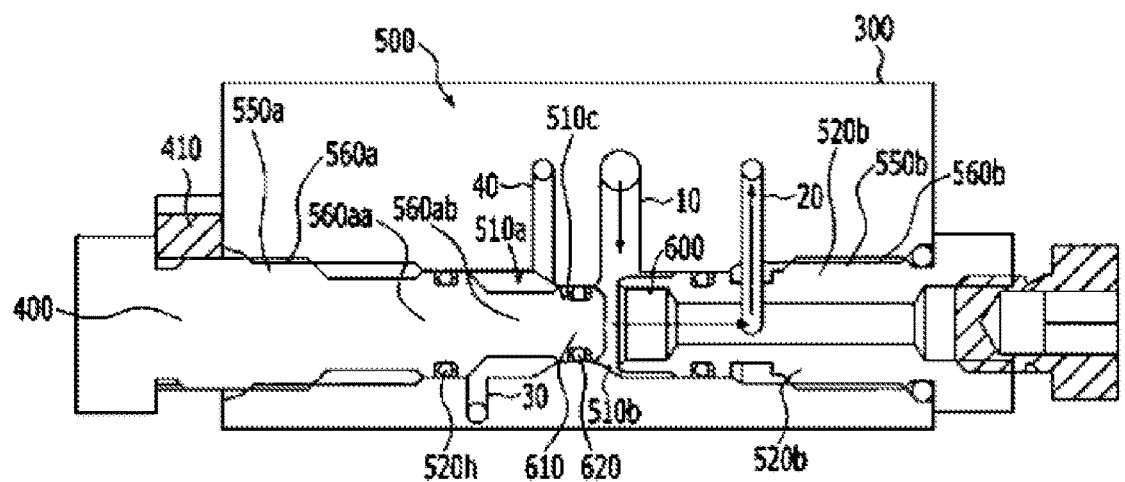

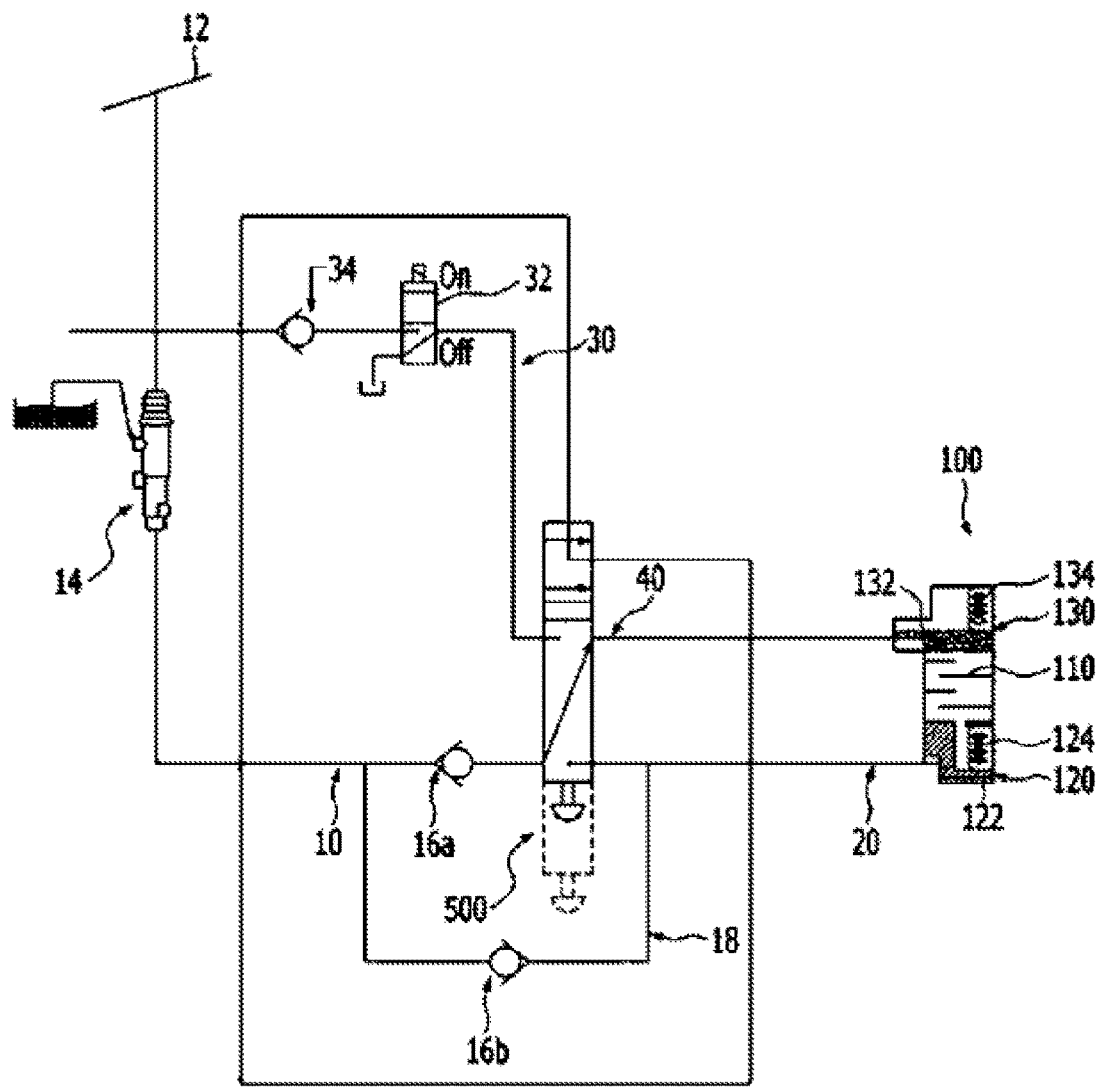
[Fig 9]

【Fig 10】
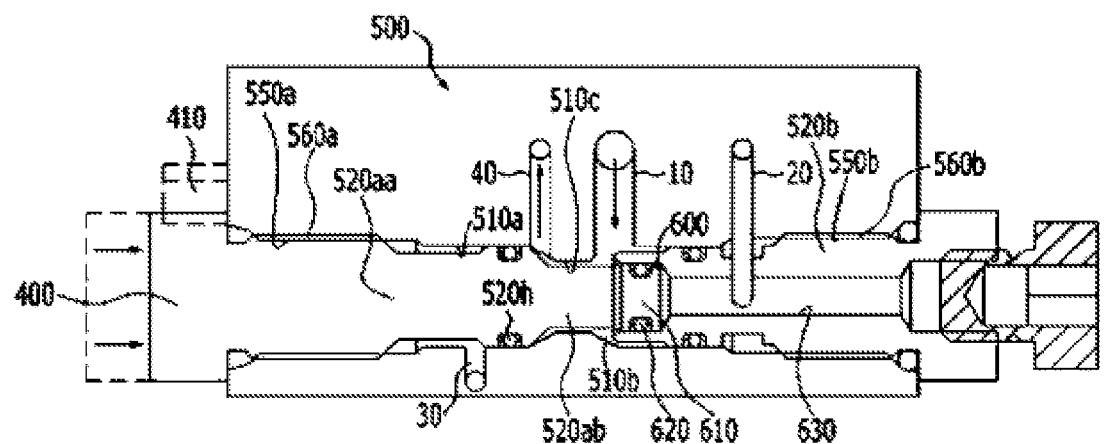

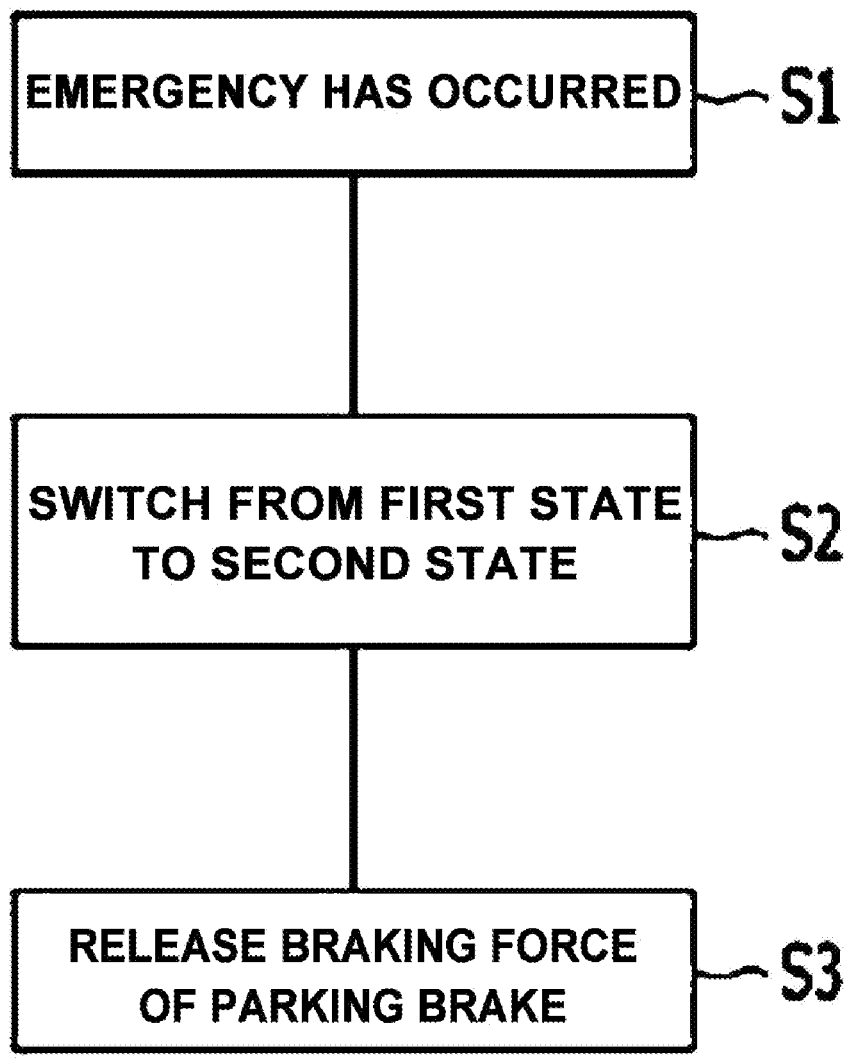
[Fig 11]

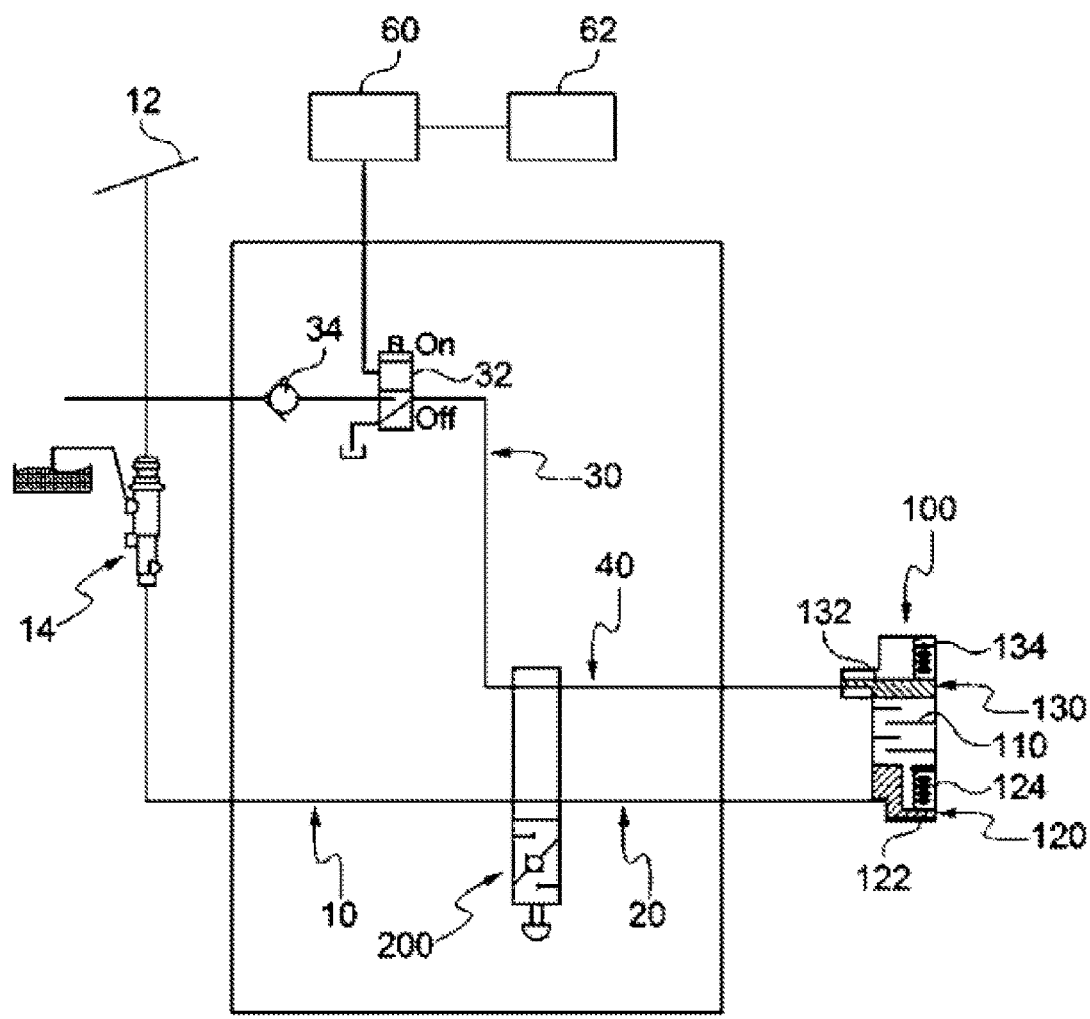
[Fig 12]

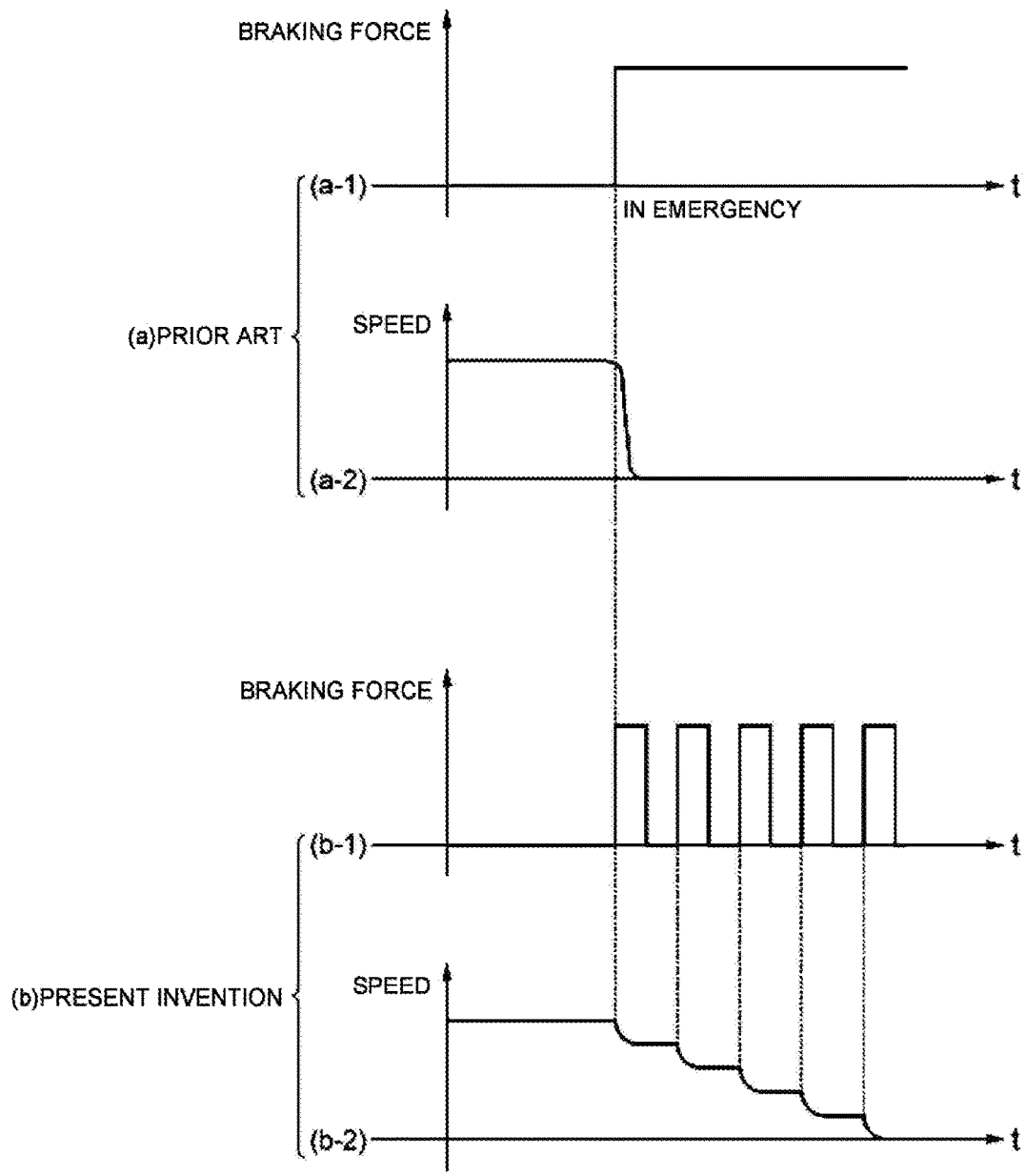
[Fig 13]

DEVICE AND METHOD FOR BRAKING AND VEHICLE USING SAME

CROSS REFERENCE TO RELATED APPLICATION AND CLAIM OF PRIORITY

This application claims benefit under 35 U.S.C. 119(e), 120, 121, or 365(c), and is a National Stage entry from International Application No. PCT/KR2014/007997, filed Aug. 28, 2014, which claims priority to and the benefit of Korean Patent Application Nos. 10-2013-0102383 filed in the Korean Intellectual Property Office on Aug. 28, 2013, and 10-2014-0112985 filed in the Korean Intellectual Property Office on Aug. 28, 2014, the entire contents of which are incorporated herein by reference.

BACKGROUND

Technical Field

The present invention relates to a vehicle braking technology, and more particularly, to a device and method for braking.

Background Art

A brake device is a mechanical device that uses a force generated by an operating force of a driver or an auxiliary power, e.g. a friction force, to convert kinetic energy of vehicles including a car, heavy equipment, etc. to thermal energy in order to perform braking. Brake devices used in the vehicles, etc. include a service brake that operates by a driver's operation during driving and a parking brake that operates by a driver's operation for stopping or parking a vehicle.

The brake devices are classified as friction type and non-friction type depending on whether a friction force is used or not. The friction type includes a vacuum brakes air hydraulic brake, etc. and the non-friction type includes an electronic brake, a fluid type brake, etc. The hydraulic type among the friction type brakes is used in most cars, and a driver's force of stepping on a pedal is transferred via hydraulic pressure to be converted to a braking force on wheels. Also, the air brake is used much in large vehicles including a bus, a truck, etc.

Meanwhile, the brake devices may be classified as a positive brake system and a negative brake system. The positive brake system refers to a brake system that is operated so that a pressure is supplied to brake disks that are basically not in contact so that the brake disks comes in contact for stopping a vehicle or lowering a speed of the vehicle. Conversely, the negative brake system refers to a brake system that is operated so that a pressure is supplied to brake disks that are basically in contact so that the brake disks are detached for moving a vehicle.

Here, in the negative brake system, although a brake in a normal state operates by a release of a pressure under a driver's control, in a situation where a vehicle stalls while driving, a situation where an engine has stopped abnormally, a situation where an abnormality has occurred in an electric system, and a situation where an abnormality has occurred in a hydraulic or pneumatic system, a pressure supplied to a parking brake is automatically released to be in a state where a braking force of the parking brake is applied.

In such an emergency situation, in order to repair the vehicle, the braking force caused by the parking brake has to be released or the vehicle itself has to be lifted and carried.

Here, the braking force caused by the parking brake must be released when moving the vehicle itself is impossible or difficult, and for this, a method of releasing the braking force has been used conventionally where a brake system itself is disassembled or hole is made that communicates with a brake chamber to supply a pressure to a brake by a separate pressure supplying means.

However, since the work required for disassembling the brake system itself in the vehicle or artificially making a hole at the brake system to supply the pressure, the work has to be done by an expert using specific equipment for a long time.

Meanwhile, when a pressure supplied to a parking brake is automatically released due to an abnormality such as a failure of a service brake that occurs during driving a vehicle, the vehicle suddenly stops due to a braking force being applied to the parking brake. In this manner, when the vehicle suddenly stops by the parking brake, a dangerous situation may occur in which a driver or an occupant collides with an inner structure of the vehicle by severely leaning to one side, the vehicle spins out of control due to losing balance, etc.

SUMMARY

The present invention is directed to providing a device and method capable of easily releasing a state in which a braking force of a parking brake has been applied in an emergency state in a vehicle, etc. with a negative brake system applied.

In addition, the present invention is directed to providing a device and method in which a worker may easily release the state in which a braking force of a parking brake is applied by using only a simple operation of a parking releasing valve to apply a service brake.

The present invention is directed to providing a device and method capable of preventing a dangerous situation caused by a sudden braking of a parking brake.

In accordance with an embodiment of the present invention, a brake device is a brake device being used in a negative brake system, and includes a first line of a service brake capable of supplying or withdrawing a pressure to apply or release a braking force of the service brake, a first line of a parking brake capable of supplying or withdrawing a pressure to apply or release a braking force of the parking brake, a second line of the service brake connected to a first chamber at one side of brake disks to supply a pressure to the first chamber, a second line of the parking brake connected to a second chamber at the other side of the brake disks to supply a pressure to the second chamber, and a parking releasing valve capable of switching between a first state in which the first and the second lines of the service brake communicate with each other and the first and the second lines of the parking brake communicates with each other and a second state in which the first line of the service brake and the second line of the parking brake communicate with each other.

The second state may be a state in which the first line of the parking brake and the second line of the service brake are disconnected therebetween.

In the second state switched by the parking releasing valve, a parking brake may be released by a pressure being supplied via the first line of the service brake and the second line of the parking brake.

The parking releasing valve includes a spool inserted into a valve hole communicating with each of the first line of the service brake, the first line of the parking brake, the second line of the service brake, and the second line of the parking brake, wherein the spool may move between a first position causing the first state and a second position causing the second state.

A position at which the first and the second lines of the service brake communicate with the valve hole may be located more inward in the valve hole than a position at which the first and the second lines of the parking brake communicate with the valve hole.

The valve hole may include a first hole part forming a cylindrical hole and a second hole part connected to an inner end portion of the first hole part and forming a cylindrical hole having a smaller diameter than a diameter of the first hole part, and the spool may include a first cylindrical main body part having an outer surface formed in a shape corresponding to the first hole part and a second cylindrical main body part connected to an end portion of the first cylindrical main body part and having an outer surface formed in a shape corresponding to the second hole part.

When the spool is at the first position, the first and the second lines of the service brake may communicate with the valve hole at the second hole part, and the first and the second lines of the parking brake may communicate with the valve hole at the first hole part.

The first position may be a position where an inner end portion of the spool is located more outward in the valve hole than the position at which the first and second lines of the service brake communicate with the valve hole.

The second position may be a position where the inner end portion of the spool is located more inward in the valve hole than the position at which the first line of the service brake communicates with the valve hole.

When the spool is at the first position, the first and the second lines of the service brake may communicate with each other more inward in the valve hole than the inner end portion of the spool, and the first and the second lines of the parking brake may communicate with each other more outward in the valve hole than the inner end portion of the spool.

The spool may include a spool main body forming an exterior of the spool, a spool groove formed at the spool main body up to a predetermined position in the longitudinal direction, a spool first pipe channel formed from an inside of the spool groove to a radial outer surface of the spool main body to communicate with the first line of the service brake when the spool is at the second position, and a spool second pipe channel formed from an inside of the spool groove to the radial outer surface of the spool main body to communicate with the second line of the parking brake when the spool is at the second position.

The spool first pipe channel may be formed from an inner end portion of the spool groove to the radial outer surface of the spool main body, and the spool may include a spool ball located inside the spool groove, an elastic member having one end elastically supporting the spool ball such that the spool ball is located at the inner end portion of the spool groove, and a support part to support the other end of the elastic member.

The spool may include a first cylindrical main body part forming an exterior of the spool, a second cylindrical main body part having one end connected to one end portion of the first cylindrical main body part and having a smaller diameter than the first cylindrical main body part, and an insertion end portion connected to one end portion of the second cylindrical main body part.

The brake device may further include a control unit to control supply and withdrawal of a pressure in a parking brake line such that a braking force releasing interval of the parking brake exists in addition to a braking force applying interval of the parking brake when a vehicle is stopped by the parking brake when an emergency state of the vehicle occurs.

The brake device may further include a valve provided on the first line of the parking brake, and the control unit may control braking force application of the parking brake and braking force release of the parking brake by controlling the valve to be turned on and off.

The valve may be a proportional valve.

The control unit may control such that the braking force application of the parking brake and the braking force release of the parking brake are repeated.

The control unit may adjust a frequency with which the braking force application and the braking force release of the parking brake are repeated depending on a speed of the vehicle.

The control unit may increase the frequency with which the braking force application and the braking force release of the parking brake are repeated with increasing speed of the vehicle.

In accordance with an embodiment of the present invention, a braking method is a braking method of a negative brake system, and includes a first step of being switched from a first state in which a first line of a service brake capable of supplying or withdrawing a pressure to apply or release a braking force of the service brake is connected to a first chamber at one side of brake disks to communicate with a second line of the service brake capable of supplying a pressure to the first chamber and a first line of a parking brake capable of supplying or withdrawing a pressure to apply or release a braking force of the parking brake is connected to a second chamber at the other side of the brake disks to communicate with a second line of the parking brake capable of supplying a pressure to the second chamber to a second state in which the first line of the service brake and the second line of the parking brake communicate with each other, and a second step in which a pressure is supplied via the first line of the service brake and the second line of the parking brake to release the braking force of the parking brake.

The second state may be a state in which the first line of the parking brake and the second line of the service brake are disconnected therebetween.

In the first step, the switching from the first state to the second state may be performed by a parking releasing valve connected to the first and second lines of the service brake and the first and second lines of the parking brake, the parking releasing valve may include a spool inserted into a valve hole that communicates with each of the first line of the service brake, the first line of the parking brake, the second line of the service brake, and the second line of the parking brake, and the spool may move between a first position causing the first state and a second position causing the second state.

The first position may be a position where an inner end portion of the spool is located more outward in the valve hole than the position at which the first and the second lines of the service brake communicate with the valve hole.

The second position may be a position where the inner end portion of the spool is located more inward in the valve hole than the position at which the first line of the service brake communicates with the valve hole.

When the spool is at the first position, the first and the second lines of the service brake may communicate with each other more inward in the valve hole than the inner end portion of the spool, and the first and the second lines of the parking brake may communicate with each other more outward in the valve hole than the inner end portion of the spool.

Before the first step, the braking method may further include detecting an occurrence of an emergency state of a vehicle in a negative brake system, and stopping the vehicle using a parking brake when the occurrence of an emergency state of the vehicle is detected, and, in the stopping of the vehicle, a braking force releasing interval of the parking brake in addition to a braking force applying interval of the parking brake may exist while the vehicle is stopping.

In the stopping of the vehicle, the braking force application by the parking brake and the braking force release by the parking brake may be repeated.

In the stopping of the vehicle, a frequency with which the braking force application and the braking force release of the parking brake are repeated may be adjusted depending on a speed of the vehicle.

In the stopping of the vehicle, the frequency with which the braking force application and the braking force release of the parking brake are repeated may increase with increasing speed of the vehicle.

The present invention has an effect of easily releasing a state in which a braking force caused by a parking brake has been applied due to an emergency in a vehicle, etc. with a negative brake system applied.

In addition, the present invention has an effect of enabling a worker to easily release the state in which a braking force of a parking brake has been applied by using only a simple operation of a parking releasing valve to apply a service brake.

In accordance with an embodiment of the present invention, a vehicle may be gradually stopped while preventing a sudden stop caused by a parking brake when an emergency state of the vehicle occurs. Thus, the present invention has an effect of protecting an occupant and a vehicle from a dangerous situation caused by a sudden stopping of the vehicle when an emergency state of the vehicle occurs.

BRIEF DESCRIPTION OF DRAWINGS

FIGS. 1 and 2 are a conceptual view of a state in which a parking brake of a brake device is turned off and a cross-sectional view of a parking releasing valve according to a first embodiment of the present invention, respectively.

FIGS. 3 and 4 are a conceptual view of a state in which a parking brake of the brake device is turned on and a cross-sectional view of a parking releasing valve according to the first embodiment of the present invention, respectively.

FIGS. 5 and 6 are a conceptual view of an emergency state of the brake device and a cross-sectional view of a parking releasing valve according to the first embodiment of the present invention, respectively.

FIGS. 7 and 8 are a conceptual view of a state in which a parking brake of a brake device is turned on and a cross-sectional view of a parking releasing valve according to a second embodiment of the present invention, respectively.

FIGS. 9 and 10 are a conceptual view of an emergency state of the brake device and a cross-sectional view of a parking releasing valve according to the second embodiment of the present invention, respectively.

FIG. 11 is a flow chart of a braking method according to an embodiment of the present invention.

FIG. 12 is a view schematically illustrating a brake device according to still another embodiment.

FIG. 13 is a view illustrating graphs comparing a parking brake control operation of the prior art and a parking brake control operation of the present invention when an emergency state of a vehicle occurs.

DETAILED DESCRIPTION

Hereinafter, exemplary embodiments of the present invention will be described in detail with reference to the accompanying drawings. In describing the present invention, when detailed description of a known art related to the present invention is deemed to make the gist of the present invention unnecessarily vague, the detailed description thereof will be omitted. Also, terms used below are terms defined by considering functions in the present invention and may be different depending on intention or practice of a user and an operator. Thus, the terms should be defined based on content throughout this specification.

Meanwhile, the technical spirit of the present invention is determined by the claims, and the embodiments below are only a means for efficiently describing the technical spirit of the present invention to those of ordinary skill in the art to which the present invention pertains.

Hereinafter, referring to FIGS. 1 to 6, details of a brake device in accordance with a first embodiment of the present invention and compositions and actions, etc. of brake devices in accordance with the first embodiment of the present invention in a state where a parking brake is released when a vehicle is stalled or being parked or stopped, being driven, and in an emergency will be described.

Hereinafter, supplying a pressure for applying and releasing a braking force may be performed using a pressure of a fluid, and here, the pressure of the fluid may be hydraulic or pneumatic. Hereinafter, in describing the embodiments of the present invention, "supplying a pressure" represents supplying a pressure using a hydraulic pressure or a pneumatic pressure.

First, as illustrated in FIGS. 1, 3, and 5, a brake device in accordance with the first embodiment of the present invention is a device used in a negative brake system and includes a first line 10 of a service brake capable of supplying or recovering a pressure to apply or release a braking force of the service brake and a first line 30 of a parking brake capable of supplying or recovering a pressure to apply or release a braking force of the parking brake. Also, the brake device includes a second line 20 of the service brake connected to a first chamber 120 at one side of brake disks 110 located in a brake assembly 100 to supply a pressure to the first chamber 120 and a second line 40 of the parking brake connected to a second chamber 130 at the other side of the brake disks 110 to supply a pressure to the second chamber 130. Here, chamber blocks 122 and 132 and elastic mechanism 124 and 134 elastically supporting the chamber blocks 122 and 132, respectively, may be disposed at the first chamber 120 and the second chamber 130, respectively. In the first chamber 120, the chamber block 122 overcomes a support force of the elastic mechanism 124 and apply a braking force to a brake by a supply of pressure, and the brake may be released by a restoring force of the elastic mechanism 124 when the pressure is recovered. In the second chamber 130, a state in which the chamber block 132 is applying a braking force to a brake by being elastically supported may become a state in which the chamber block 132 may overcome a support force of the elastic mechanism 134 and release the brake by a supply of pressure.

Furthermore, the brake device in accordance with the embodiment of the present invention includes a parking releasing valve 200. The parking releasing valve 200 may switch between a first state (FIGS. 1 and 3) in which the first line 10 of the service brake and the second line 20 of the service brake communicate and the first line 30 of the parking brake and the second line 40 of the parking brake communicates and a second state (FIG. 5) in which the first line 10 of the service brake and the second line 40 of the parking brake communicate. Meanwhile, an additional check valve 34 may be disposed on the first line 30 of the parking brake to regulate a supply of pressure to the first line 30 of the parking brake.

Here, referring to FIGS. 2, 4, and 6, a detailed description on the parking releasing valve 200 in accordance with the first embodiment of the present invention is as follows.

First, the parking releasing valve 200 may include a spool 220 inserted into a valve hole 210 communicating with each of the first line 10 of the service brake, the first line 30 of the parking brake, the second line 20 of the service brake, and the second line 40 of the parking brake. Here, a guide protruding part 250 may be formed at an outer surface of the spool 220 such that the spool 220 may be guided inside the valve hole 210, and a guide groove 260 may also be formed at an inner surface of the valve hole 210 to guide the guide protruding part 250 to a position corresponding to the guide protruding part 250. Also, although not illustrated by a drawing, a guide protruding part protruding in the radial direction and extending in the longitudinal direction may be formed at the outer surface of the spool 220, and a guide groove corresponding to the guide protruding part may also be formed at an inner surface of the valve hole 210, conversely.

Meanwhile, with respect to the valve hole 210, a direction in which the valve hole 210 is shallow, that is, the left direction in FIGS. 2, 4, and 6, is referred to as an outside of the valve hole 210, and a direction in which the valve hole 210 is deep, i.e. the right direction in FIGS. 2, 4, and 6, is referred to as an inside of the valve hole 210, and this is the same also in the description below.

Here, the valve hole 210 may be, for example, formed at a flow pipe body 300 disposed in a brake system. The flow pipe body 300 refers to a structure in which a pipe channel is formed to enable each line included in the brake device in accordance with the embodiment of the present invention, that is, the first line 10 of the service brake, the first line 30 of the parking brake, the second line 20 of the service brake, and the second line 40 of the parking brake for easy communication between each other.

The valve hole 210 communicates with each of the first line 10 of the service brake, the first line 30 of the parking brake, the second line 20 of the service brake, and the second line 40 of the parking brake, and the spool 220 is inserted into the valve hole 210, wherein the spool 220 is inserted into the valve hole 210 to be able to move by a predetermined distance inside the valve hole 210. By the spool 220 moving by the predetermined distance, the first line 10 of the service brake, the first line 30 of the parking brake, the second line 20 of the service brake, and the second line 40 of the parking brake communicating with the valve hole 210 may selectively communicate with each other.

Here, the predetermined distance refers to a distance by which the spool 220 is moved to switch between the first state (FIGS. 1 and 3) in which the first line 10 of the service brake and the second line 20 of the service brake communicate and the first line 30 of the parking brake and the second line 40 of the parking brake communicate and the second state (FIG. 5) in which the first line 10 of the service brake and the second line 40 of the parking brake communicate. Specifically, the distance refers to a distance between a first position (FIGS. 1 and 3) of the spool 220 forming the first state and a second position (FIG. 5) of the spool 220 forming the second state. Meanwhile, in the first state, as illustrated in FIGS. 2 and 4, a locking piece 410 may be inserted into a locking part 400 formed at an outer end portion of the spool 220 for the spool 220 to be fixed to the first position.

Meanwhile, as illustrated in FIGS. 2, 4, and 6, the first line 10 of the service brake and the second line 20 of the service brake may be located even deeper (right side in FIGS. 2, 4, and 6) than the first line 30 of the parking brake and the second line 40 of the parking brake in the valve hole 210. By this, the movement of the spool 220, specifically, the movement between the first position forming the first state and the second position forming the second state, may be more easily set.

Specifically, when the spool 220 is at the first position where the spool 220 is moved toward a left side of the valve hole 210 as illustrated in FIGS. 2 and 4, to form the first state, in other words, when an inner end portion of the spool 220 is located more leftward (outward) of the valve hole 210 than a position at which the first line 10 of the service brake and the second line 20 of the service brake communicate with the valve hole 210, the spool 220 is deviated from a position at which each of the first line 10 of the service brake and the second line 20 of the service brake communicate in the valve hole 210. Consequently, the first line 10 of the service brake and the second line 20 of the service brake may easily communicate, and therefore, a supply or release of pressure via the first line 10 of the service brake may be easily applied to the first chamber 120 via the second line 20 of the service brake.

In addition, when the spool 220 is at the second position where the spool 220 is moved deeply toward a right side of the valve hole 210 as illustrated in FIG. 6, in other words, when the inner end portion of the spool 220 is located more rightward (inward) of the valve hole 210 than a position at which the first line 10 of the service brake communicates with the valve hole 210, the communication between the first line 10 of the service brake and the second line 20 of the service brake is disconnected. Furthermore, a spool first pipe channel 222 formed at the spool 220 communicates with the first line 10 of the service brake, and a spool second pipe channel 224 communicates with the second line 40 of the parking brake, thereby enabling the first line 10 of the service brake and the second line 40 of the parking brake to communicate with each other.

In more detail, as illustrated in FIGS. 2, 4, and 6, the valve hole includes a first hole part 210a forming a cylindrical hole and a second hole part 210b connected to an inner end portion of the first hole part 210a and forming a cylindrical hole having a smaller diameter than a diameter of the first hole part 210a. Also, the spool 220 includes a first cylindrical main body part 220a having an outer surface formed in a shape corresponding to the first hole part 210a and a second cylindrical main body part 220b connected to an end portion of the first cylindrical main body part 220a and having an outer surface formed in a shape corresponding to the second hole part 210b.

Here, with respect to the valve hole 210, since the second hole part 210b is located more inward in the valve hole 210 than the first hole part 210a, the first line 10 of the service brake and the second line 20 of the service brake may communicate with the valve hole 210 at the second hole part 210b, and the first line 30 of the parking brake and the second line 40 of the parking brake may communicate with the valve hole 210 at the first hole part 210a. By this, the first line 10 of the service brake and the second line 20 of the service brake may be located deeper (right side in FIGS. 2, 4, and 6) than the first line 30 of the parking brake and the second line 40 of the parking brake.

Here, "cylindrical shape" and "shape corresponding to the cylindrical shape" used to describe the first hole part 210a, the second hole part 210b, the first cylindrical main body part 220a, and the second cylindrical main body part 220b represent not only a mathematical cylindrical shape but all shapes that may be viewed as a cylindrical shape. For example, as illustrated in FIGS. 2, 4, and 6, with respect to the valve hole 210, even when an inclined part along which a diameter of an inner end portion of the first hole part 210a gradually decreases exists at a portion where the second hole part 210b is connected to the inner end portion of the first hole part 210a, the inclined part may be viewed as a part of the first hole part 210a. Also, with respect to the spool 220, even when an inclined part along which a diameter of an inner end portion of the first cylindrical main body part 220a slightly decreases exists at a portion where the second cylindrical main body part 220b is connected to the inner end portion of the first cylindrical main body part 220a, the inclined part may be viewed as a part of the first cylindrical main body part 220a.

In addition, when the shape of the spool 220 is described in more detail, the spool 220 may include spool main bodies 220a and 220b including the first cylindrical main body part 220a and the second cylindrical main body part 220b as well as a spool groove 220c formed from the spool main bodies 220a and 220b up to a predetermined position in the longitudinal direction. Also, the spool 220 may include the spool first pipe channel 222 formed at an inside of the spool groove 220c up to radial outer surfaces of the spool main bodies 220a and 220b to communicate with the first line 10 of the service brake when the spool 220 is at the second position as well as the spool second pipe channel 224 formed at the inside of the spool groove 220c up to the radial outer surfaces of the spool main bodies 220a and 220b to communicate with the second line 40 of the parking brake when the spool 220 is at the second position.

That is, the first pipe channel 222 and the second pipe channel 224 formed from the inside of the spool groove 220c up to the radial outer surfaces are formed from the inside of the spool groove 220c, thus coming into fluidic communication with the spool groove 220c. Also, since the first pipe channel 222 may communicate with the first line 10 of the service brake and the second pipe channel 224 may communicate with the second line 40 of the parking brake when the spool 220 is at the second position, as a result, the first line 10 of the service brake and the second line 40 of the parking brake may come into fluidic communication via the first pipe channel 222, the spool groove 220c, and the second pipe channel 224 when the spool 220 is at the second position.

Besides, a spool ball 220d, an elastic member 220e, and a support part 220f may be disposed in the spool groove 220c. Here, the elastic member 220e may have one side supporting the spool ball 220d and the other side supported by the support part 220f to press the spool ball 220d to be located at the inner end portion of the spool groove 220c. Here, a diameter of the spool ball 220d is formed not to be larger than a diameter of the spool groove 220c thus is formed to be movable in the spool groove 220c.

This configuration is for enabling the spool ball 220d to block the first pipe channel 222 when the spool 220 is at the second position.

Specifically, when one end of the first pipe channel 222 is formed at the inner end portion of the spool groove 220c and the other end thereof is formed at the radial outer surfaces of the spool main bodies 220a and 220b, in other words, when the first pipe channel 222 is formed beginning from the inner end portion of the spool groove 220c, bent, and formed up to the radial outer surfaces of the spool main bodies 220a and 220b, the first pipe channel 222 is blocked by the spool ball 220d when the spool ball 220d is located at the inner end portion while being pressed by the elastic member 220e.

Here, since the spool 220 is at the second position, that is, a position causing the second state in which the first line 10 of the service brake and the second line 40 of the parking brake may communicate, a pressure is supplied via the first line 10 of the service brake, wherein, when a pressure greater than a pressing force of the elastic member 220e is supplied, the spool ball 220d may overcome the pressing force of the elastic member 220e and be moved leftward of FIG. 6, thereby completing a fluidic communication passage of the first line 10 of the service brake and the second line 40 of the parking brake.

By the above configuration, in the second state in which the first line 10 of the service brake and the second line 40 of the parking brake may communicate, the fluidic communication passage of the first line 10 of the service brake and the second line 40 of the parking brake may be completed only when a pressure is supplied via the first line 10 of the service brake, specifically, when a driver presses a brake pedal connected to the first line 10 of the service brake.

Meanwhile, in the above description, the elastic member 220e may be a spring, and various elastic members other than the above may be used. Also, the support part 220f may be a member inserted into the spool groove 220c from an outside of the spool groove 220c and may be formed to secure an airtightness to prevent the spool groove 220c from communicating with the outside of the spool groove 220c. Also, a separate oil ring 220h may be disposed at an outside of the first cylindrical main body part 220a to definitely secure an airtightness. Here, the oil ring 220h may be an O-ring.

In addition, when the spool 220 is at the second position, an oil ring 220g for securing airtightness may be provided between the inner end portion of the spool 220 and the first pipe channel 222 and between the first pipe channel 222 and the second pipe channel 224 such that a fluid for supplying a pressure from the first line 10 of the service brake may be introduced only to the first pipe channel 222.

Next, to describe the brake device in accordance with the embodiment of the present invention in more detail with reference to FIGS. 1, 3, and 5, the present invention will be described with respect to states in which a vehicle is stalled, stopped, or parked, and being driven. Arrows in FIGS. 1, 3, and 5 represent a direction in which a pressure may move, and more specifically, a direction in which a fluid for supplying the pressure may move. However, this will be expressed as a movement of pressure, hereinafter.

First, as illustrated in FIGS. 1 and 3, the brake device in accordance with the present invention includes the first line 10 of the service brake capable of supplying or recovering a pressure to apply or release a braking force of the service brake, the first line 30 of the parking brake capable of supplying or recovering a pressure to apply or release a braking force of the parking brake, the second line 20 of the service brake connected to the first chamber 120 at one side of the brake disks 110 to supply a pressure to the first chamber 120, and the second line 40 of the parking brake connected to the second chamber 130 at the other side of the brake disks 110 to supply a pressure to the second chamber 130.

FIG. 1 is a view illustrating a state when a vehicle is stalled, stopped, or parked.

As illustrated in FIG. 1, when a vehicle is stalled, stopped, or parked, a valve 32 provided on the first line 30 of the parking brake is turned off. In this case, due to the nature of a negative brake system, since a fluid in the second chamber 130 of the brake assembly 100 is discharged via the second line 40 of the parking brake and the first line 30 of the parking brake, the brake disks 110 come in contact with each other, causing a state in which a braking force of the parking brake is applied.

In addition, the first line 10 of the service brake is connected to a brake pedal 12, and a service brake pressure supply device 14 is provide on a path of the brake pedal 12.

In this manner, when the vehicle is stalled, stopped, or parked, the vehicle becomes standstill due to the state in which the braking force of the parking brake is applied.

Next, FIG. 3 is a view illustrating a state in which a vehicle is being driven.

As illustrated in FIG. 3, when a vehicle is being driven, the valve 32 provided on the first line 30 of the parking brake is turned on. In this case, a pressure may be supplied to the second chamber 130 of the brake assembly 100 via the second line 40 of the parking brake from the first line 30 of the parking brake, and due to the supply of pressure, the brake disks 110 are spaced apart from each other, causing a state in which the braking force of the parking brake is released.

In addition, the first line 10 of the service brake is connected to the brake pedal 12, and the service brake pressure supply device 14 is provided on the path of the brake pedal 12. Here, when a pressure is supplied to the first chamber 120 of the brake assembly 100 from the service brake pressure supply device 14 due to a driver pressing the brake pedal 12, the brake disks 110 may come in contact such that a braking force may be applied by a service brake. Conversely, since a fluid in the first chamber 120 of the brake assembly 100 is discharged via the second line 20 of the service brake and the first line 10 of the service brake when pressing of the brake pedal 12 by the driver is released, the brake disks 110 are spaced apart such that the braking force caused by the service brake is released. That is, the brake disks 110 may come in contact or be apart depending on whether the brake pedal 12 is pressed by the driver.

In this manner, the braking force of the parking brake is released while the vehicle is being driven, and the braking force of the service brake may be applied or released depending on whether the brake pedal 12 is pressed.

As described above, a vehicle is in a normal state when the vehicle is stopped, or parked, and being driven, and the parking releasing valve 200 in accordance with the embodiment of the present invention is in the first state, that is, a state in which the first line 10 of the service brake and the second line 20 of the service brake communicate and the first line 30 of the parking brake and the second line 40 of the parking brake communicate.

When the first state is examined in detail related to the first embodiment of the present invention, as illustrated in FIG. 2, the spool 220 is at the first position of being moved a predetermined distance outward from the valve hole 210, in other word, the spool 220 is at a state in which the inner end portion of the spool 220 is placed more outward than the first line 10 of the service brake and the second line 20 of the service brake. Here, the first line 10 of the service brake and the second line 20 of the service brake communicate with each other at a right side of the inner end portion of the spool 220.

Meanwhile, in the first state as above, as illustrated in FIGS. 2 and 4, the locking piece 410 may be inserted into the locking part 400 formed at an outer end portion of the spool 220 such that the spool 220 may be fixed to the first position.

Here, since a diameter of the first hole part 210a of the valve hole 210 is larger than a diameter of the second cylindrical main body part 220b of the spool 220 having a portion thereof located at the first hole part 210a, the first line 30 of the parking brake and the second line 40 of the parking brake communicating with the first hole part 210a may communicate with each other via a space between the second cylindrical main body part 220b and the first hole part 210a.

By this, when described with respect to the inner end portion of the spool 220, the first line 10 of the service brake and the second line 20 of the service brake communicate at a more inward side of the valve hole 210 than the inner end portion of the spool 220, and the first line 30 of the parking brake and the second line 40 of the parking brake communicate at a more outward side of the valve hole 210 than the inner end portion of the spool 220.

Next, FIG. 5 is a view illustrating an emergency state such as a situation where a vehicle is stalled, a situation where an engine is stopped abnormally, a situation where an abnormality has occurred in an electric system, and a situation where an abnormality has occurred in a hydraulic or pneumatic system.

As illustrated in FIG. 5, when a vehicle is in an emergency state, a supply of pressure to the first line 30 of the parking brake of the vehicle stops, causing the fluid in the second chamber 130 of the brake assembly 100 to be discharged via the second line 40 of the parking brake and the first line 30 of the parking brake. Consequently, the brake disks 110 come in contact with each other, causing a state in which the braking force of the parking brake is applied. Meanwhile, to easily describe the state here, the valve 32 provided on the first line 30 of the parking brake is illustrated as being turned off.

In addition, likewise, the first line 10 of the service brake is connected to the brake pedal 12, and the service brake pressure supply device 14 is provided on the path of the brake pedal 12.

In this manner, since the braking force of the parking brake is applied when the vehicle is in an emergency state, the vehicle becomes standstill.

In this state, when the parking releasing valve 200 that has been in the first state is switched to the second state in which the first line 10 of the service brake and the second line 40 of the parking brake communicate as illustrated in FIG. 6, in other words, when the spool 220 moves (displayed by a solid line in FIG. 5) to the second position causing the second state, the state in which the braking force of the parking brake is applied may be released.

When the second state is examined in detail related to the first embodiment of the present invention, in the second state, as illustrated in FIG. 6, the spool 220 is at the second position of being deeply inserted into the valve hole 210, that is, a state in which the inner end portion of the spool 220 is placed more inward than the first line 10 of the service brake. In this state, the first line 10 of the service brake communicates with the first pipe channel 222 of the spool 220, and the second line 40 of the parking brake communicates with the second pipe channel 224 of the spool 220.

Consequently, the first line 10 of the service brake may communicate with the second line 40 of the parking brake via the first pipe channel 222, the spool groove 220c, and the second pipe channel 224. Here, when the brake pedal 12 is pressed, a pressure is supplied to the first line 10 of the service brake via the service brake pressure supply device 14, and accordingly, the spool ball 220d that has been supported by the elastic member 220e to block the first pipe channel 222 is moved to the left side in FIG. 6, and the pressure supplied to the first line 10 of the service brake is supplied to the second line 40 of the parking brake.

As a result, a pressure is supplied to the second chamber 130 at the other side of the brake disks 110 connected to the second line 40 of the parking brake, thereby releasing the braking force of the parking brake.

In such an emergency state, the first line 30 of the parking brake and the second line 20 of the service brake may be in a disconnected state. However, in the brake device in accordance with the embodiment of the present invention, the first line 30 of the parking brake and the second line 20 of the service brake being connected is immaterial since the pressure that has passed through the first line 10 of the service brake is passed through the second line 40 of the parking brake to release the braking force of the parking brake in an emergency state and a pressure is not supplied via the first line 30 of the parking brake.

Next, referring to FIGS. 7 to 10, a brake device in accordance with a second embodiment of the present invention will be described in detail. In describing the second embodiment of the present invention, description of parts overlapping with the above-mentioned first embodiment will be omitted, and since an element having the same reference numeral represents an element performing the same function, the detailed description thereof will also be omitted. Also, when a structure described related to the first embodiment can also be employed to the second embodiment from the point of view of those of ordinary skill in the art, the second embodiment includes the structure, but will not describe them in detail below.

An emergency releasing device in accordance with the second embodiment of the present invention uses two spools, and by a first spool being inserted into a second spool, the first state is changed to the second state.

Same as the case of the first embodiment, a supply of pressure for applying and releasing a braking force may be performed by a pressure of a fluid, and here, the pressure of the fluid may be a hydraulic pressure or pneumatic pressure. Hereinafter, in describing the embodiment of the present invention, "supply of pressure" represents a supply of pressure by the hydraulic pressure or the pneumatic pressure.

First, as illustrated in FIGS. 7 and 9, a brake device in accordance with the present invention is a device used in a negative brake system and includes the first line 10 of the service brake capable of supplying or recovering a pressure to apply or release a braking force of the service brake and the first line 30 of the parking brake capable of supplying or recovering a pressure to apply or release a braking force of the parking brake. Also, the brake device includes the second line 20 of the service brake connected to the first chamber 120 at one side of the brake disks 110 located in the brake assembly 100 to supply a pressure to the first chamber 120 and the second line 40 of the parking brake connected to the second chamber 130 at the other side of the brake disks 110 to supply a pressure to the second chamber 130. Here, the chamber blocks 122 and 132 and the elastic mechanism 124 and 134 elastically supporting the chamber blocks 122 and 132, respectively, may be disposed at the first chamber 120 and the second chamber 130, respectively. In the first chamber 120, the chamber block 122 may overcome a support force of the elastic mechanism 124 and apply a braking force to a brake by a supply of pressure, and the brake may be released by a restoring force of the elastic mechanism 124 when the pressure is recovered. In the second chamber 130, a state in which the chamber block 132 is applying a braking force to a brake by being elastically supported may become a state in which the chamber block 132 may overcome a support force of the elastic mechanism 134 and release the brake by a supply of pressure.

The brake device in accordance with the second embodiment of the present invention includes a parking releasing valve 500. The parking releasing valve 500 may switch between a first state (FIGS. 7 and 8) in which the first line 10 of the service brake and the second line 20 of the service brake communicate and the first line 30 of the parking brake and the second line 40 of the parking brake communicate and a second state (FIGS. 9 and 10) in which the first line 10 of the service brake and the second line 40 of the parking brake communicate.

In addition, a bypass line 18 bypassing the parking releasing valve 500 to connect the first line 10 of the service brake and the second line 20 of the service brake may be provide, and check valves 16a and 16b limiting a supply of pressure to one direction may be provided at the first line 10 of the service brake and the bypass line 18, respectively.

Here, referring to FIGS. 8 and 10, detailed description on the parking releasing valve 500 in accordance with the second embodiment of the present invention is as follows.

First, the parking releasing valve 500 may include a first spool 520a and a second spool 520b inserted into valve holes 510 communicating with each of the first line 10 of the service brake, the first line 30 of the parking brake, the second line 20 of the service brake, and the second line 40 of the parking brake. Here, guide protruding parts 550a and 550b protruding from outer surfaces of the first and second spools 520a and 520b may be formed such that the first and second spools 520a and 520b may be guided inside the valve holes 510, and guide grooves 560a and 560b may be formed at an inner surface of the valve holes 510 to guide the guide protruding parts 550a and 550b to a position corresponding to the guide protruding parts 550a and 550b. Also, although not illustrated by a drawing, guide protruding parts protruding in the radial direction and extending in the longitudinal direction may be formed at the outer surfaces of the spools 520a and 520b, and guide grooves corresponding to the guide protruding parts may be formed at an inner surface of the valve holes 510, conversely.

Here, the valve holes 510 may be, for example, formed at the flow pipe body 300 disposed in a brake system. The flow pipe body 300 refers to a structure in which a pipe channel is formed to enable each line included in the brake device in accordance with the present invention, that is, the first line 10 of the service brake, the first line 30 of the parking brake, the second line 20 of the service brake, and the second line 40 of the parking brake, to easily communicate with each other.

The valve holes 510 communicates with each of the first line 10 of the service brake, the first line 30 of the parking brake, the second line 20 of the service brake, and the second line 40 of the parking brake, and the first spool 520a is inserted into the valve holes 510, wherein the first spool 520a is inserted into the valve holes 510 to be able to move a predetermined distance inside the valve holes 510. By the first spool 520a moving the predetermined distance, the first line 10 of the service brake, the first line 30 of the parking brake, the second line 20 of the service brake, and the second line 40 of the parking brake communicating with the valve holes 510 may selectively communicate with each other. Here, a state in which an insertion end portion 610 of the first spool 520*a* is not inserted into a spool insertion groove 600 of the second spool 520*b* is a first state, and conversely, a state in which an insertion end portion 610 of the first spool 520*a* is inserted into the spool insertion groove 600 of the second spool 520*b* is a second state.

Here, the predetermined distance is a distance in which the insertion end portion 610 of the first spool 520*a* moves to be inserted into the spool insertion groove 600 formed at an inner end portion of the second spool 520*b* and refers to an interval in which the first spool 520*a* is moved to switch between the first state (FIG. 8) in which the first line 10 of the service brake and the second line 20 of the service brake communicate and the first line 30 of the parking brake and the second line 40 of the parking brake communicate and the second state (FIG. 10) in which the first line 10 of the service brake and the second line 40 of the parking brake communicate.

Meanwhile, in the first state, as illustrated in FIG. 8, the locking piece 410 may be inserted into the locking part 400 formed at an outer end portion of the first spool 520*a* for the first spool 520*a* to be fixed at the first position.

Meanwhile, as illustrated in FIG. 8, in the first state, the first line 10 of the service brake and the second line 20 of the service brake communicate via the second spool 520*b*, and the first line 30 of the parking brake and the second line 40 of the parking brake communicate via the first spool 520*a*.

Specifically, the valve holes 510 include a first valve hole 510*a* into which the first spool 520*a* is inserted and a second valve hole 510*b* into which the second spool 520*b* is inserted, wherein the first valve hole 510*a* and the second valve hole 510*b* may communicate via a third valve hole 510*c* formed relatively narrowly between the two.

In the first state, the first spool 520*a* is inserted into the first valve hole 510*a*, wherein the end portion 610 is inserted into the third valve hole 510*c* and an oil ring 620 is disposed around the inner end portion 610 to block a portion between the first valve hole 510*a* and the second valve hole 510*b*.

Here, the first spool 520*a* has a first cylindrical main body part 520*aa* and a second cylindrical main body part 520*ab* coupled to the inner end portion 610 at both sides and having a relatively smaller diameter than the first cylindrical main body part 520*aa*. In the first state, the first line 30 of the parking brake and the second line 40 of the parking brake communicate by an outer circumferential portion of the second cylindrical main body part 520*ab* having the small diameter.

In addition, since a through-hole 630 formed at the second spool 520*b* and communicating with the second line 20 of the service brake communicates with the spool insertion groove 600, a pressure from the first line 10 of the service brake may communicate with the second line 20 of the service brake via the spool insertion groove 600 and the through-hole 630. Here, of course, the opposite side in which the through-hole 630 is connected to the spool insertion groove 600 is sealed.

Here, a notion that "cylindrical shape" may include all shapes that may be viewed as a cylindrical shape is the same as in the above description related to the first embodiment.

Next, as illustrated in FIG. 10, in the second state, the end portion 610 of the first spool 520*a* is inserted into the spool insertion groove 600 of the second spool 520*b*. By this, the first line 10 of the service brake and the second line 20 of the service brake that pass through the spool insertion groove 600 are made not to communicate with each other, and the first line 30 of the parking brake and the second line 40 of the parking brake are made not to communicate with each other as the first cylindrical main body part 520*aa* covers the first line 30 of the parking brake. Furthermore, an oil ring 520*h* is disposed at an outer circumferential surface of the first cylindrical main body part 520*aa*, and the oil ring 520*h* is located between the first line 30 of the parking brake and the second line 40 of the parking brake in the second state, thereby effectively blocking (to not communicate) the first line 30 of the parking brake and the second line 40 of the parking brake. When the oil ring 520*h* is formed, since the communication between the first line 30 of the parking brake and the second line 40 of the parking brake is blocked, it is immaterial for the first cylindrical main body part 520*aa* to be formed such that the diameter thereof slightly decreases at a portion facing the first line 30 of the parking brake.

In the second state, the first line 10 of the service brake and the second line 40 of the parking brake communicate with each other. That is, the diameter of the second cylindrical main body part 520*ab* is formed smaller than an inner diameter of the third valve hole 510*c*, and a flow passage is formed between an outer surface of the second cylindrical main body part 520*ab* and an inner surface of the third valve hole 510*c* such that a pressure from the first line 10 of the service brake may be supplied to the second line 40 of the parking brake.

By the configuration of the parking releasing valve 500, the brake device in accordance with the second embodiment of the present invention may be switched between the first state in which the first line 10 of the service brake and the second line 20 of the service brake communicate and the first line 30 of the parking brake and the second line 40 of the parking brake communicate and the second state in which the first line 10 of the service brake and the second line 40 of the parking brake communicate.

In addition, the switching may be performed by the movement of the first spool 520*a*, and this may be performed by removing the locking piece 410. Of course, by fitting the locking piece 410 again, the first spool 520*a* may be moved back from the second position to the first position inside the first valve hole 510*a*, and thereby may be switched back to the first state corresponding to the normal state of the vehicle.

Next, referring to FIG. 11, a braking method in accordance with the present invention will be described in detail.

The braking method in accordance with the present invention is a braking method of releasing a state in which a parking brake is automatically applied in an emergency situation in a negative brake system.

First, in a normal state that is not an emergency state in the negative brake system, the first line 10 of the service brake capable of supplying or recovering a pressure to apply or release a braking force of the service brake and the second line 20 of the service brake connected to the first chamber 120 at one side of the brake disks 110 to supply a pressure to the first chamber 120 communicate, and the first line 30 of the parking brake capable of supplying or recovering a pressure to apply or release a braking force of the parking brake and the second line 40 of the parking brake connected to the second chamber 130 at the other side of the brake disks 110 to supply a pressure to the second chamber 130 communicate, thus entering a first state.

Here, when a vehicle is in an emergency state, that is, a situation where a vehicle has stalled, a situation where an engine has stopped abnormally, a situation where an abnormality has occurred in an electric system, or a situation where an abnormality has occurred in a hydraulic or pneumatic system (S1), a state in which a braking force of a parking brake is applied occurs as mentioned above. Here, to release the braking force of the parking brake, the first state is switched to a second state in which the first line 10 of the service brake and the second line 40 of the parking brake may communicate (S2).

Then, the braking force of the parking brake is released by a pressure being supplied through the second line 40 of the parking brake via the first line 10 of the service brake due to a driver pressing the brake pedal 12 (S3).

Meanwhile, in the second state, the first line 30 of the parking brake and the second line 20 of the service brake are not required, thus may be disconnected.

Meanwhile, in the first step described above, the switching from the first state to the second state may be performed by the parking releasing valve 200 connected to the first line 10 of the service brake, the second line 20 of the service brake, the first line 30 of the parking brake, and the second line 40 of the parking brake.

When the switching from the first state to the second state is examined in detail related to the first embodiment of the present invention, the parking releasing valve 200 may include the spool 220 inserted into the valve hole 210 communicating with each of the first line 10 of the service brake, the first line 30 of the parking brake, the second line 20 of the service brake, and the second line 40 of the parking brake, and due to the movement of the spool 220, a switching from the first state to the second state occurs.

That is, the switching from the first state to the second state may occur due to the spool 220 moving from the first position causing the first state to the second position causing the second state while being inserted into the valve hole 210. Of course, the spool 220 may move back to the first position from the second position in the valve hole 210, thereby may definitely be switched back to the first state corresponding to the normal state of the vehicle.

Here, the first position of the spool 220 may be a position where an inner end portion of the spool 220 is located more outward in the valve hole 210 than the position at which the first line 10 of the service brake and the second line 20 of the service brake communicate with the valve hole 210, and the second position may be a position where the inner end portion of the spool 220 is located more inward in the valve hole 210 than the position at which the first line 10 of the service brake communicates with the valve hole 210.

When the position of the spool 220 and communication relation between the lines are described in more detail, when the spool 220 is at the first position, the first line 10 of the service brake and the second line 20 of the service brake communicate at a part more inward in the valve hole 210 than the inner end portion of the spool 220, and the first line 30 of the parking brake and the second line 40 of the parking brake communicate at a part more outward in the valve hole 210 than the inner end portion of the spool 220.

In addition, when the spool 220 is at the second position, the first line 10 of the service brake and the second line 40 of the parking brake communicate with each other, and this may be enabled by the spool 220.

Specifically, to enable the communication, the spool 220 may include the spool main bodies 220a and 220b forming an exterior of the spool 220, the spool groove 220c formed from the spool main bodies 220a and 220b up to a predetermined position in the longitudinal direction, the spool first pipe channel 222 formed at an inside of the spool groove 220c up to the radial outer surfaces of the spool main bodies 220a and 220b to communicate with the first line 10 of the service brake when the spool 220 is at the second position, and the spool second pipe channel 224 formed at the inside of the spool groove 220c up to the radial outer surfaces of the spool main bodies 220a and 220b to communicate with the second line 40 of the parking brake when the spool 220 is at the second position.

By this, a communication passage connecting the first line 10 of the service brake, the spool first pipe channel 222, the spool groove 220c, the spool second pipe channel 224, and the second line 40 of the parking brake may be formed such that a pressure to the first line 10 of the service brake may be transferred to the second chamber 130 at the other side of the brake disks 110 via the second line 40 of the parking brake to release the braking force of the parking brake.

When the switching from the first state to the second state is examined in detail in relation to the second embodiment of the present invention, the parking releasing valve 500 may include the first spool 520a inserted into the first valve hole 510a communicating with each of the first line 10 of the service brake, the first line 30 of the parking brake, the second line 20 of the service brake, and the second line 40 of the parking brake, and due to the movement of the first spool 520a, a switching from the first state to the second state occurs.

That is, the switching from the first state to the second state may occur due the first spool 520a moving from the first position causing the first state to the second position causing the second state while being inserted into the first valve hole 510a. Of course, the first spool 520a may move back to the first position from the second position in the first valve hole 510a, thereby definitely may be switched back to the first state corresponding to the normal state of the vehicle.

Here, the first position of the first spool 520a may be a position where the inner end portion of the first spool 520a is located at the third valve hole 510c, and the second position may be a position where the inner end portion 610 of the first spool 520a is located to be inserted into the spool insertion groove 600 of the second spool 520b.

When the position of the first spool 520a and communication relation between the lines are described in more detail, when the first spool 520a is at the first position, the first line 30 of the parking brake and the second line 40 of the parking brake communicate by a portion around the outer circumferential portion of the first spool 520a, and the first line 10 of the service brake and the second line 20 of the service brake communicate by passing through the spool hole 600 of the second spool 520b and the through-hole 630.

In addition, when the first spool 520a is at the second position, the first line 10 of the service brake and the second line 40 of the parking brake communicate with each other, and the communication may occur via a flow passage formed between the inner surface of the third valve hole 510c and the outer surface of the second cylindrical main body part 520ab.

By this, the pressure to the first line 10 of the service brake may be transferred to the second chamber 130 at the other side of the brake disks 110 via the second line 40 of the parking brake, thus releasing the braking force of the parking brake.

The device and method for braking described above may be applied to a vehicle to which a negative brake system is applied to release a braking force applied by a parking brake in an emergency state such as a situation where a vehicle has stalled, a situation where an engine has stopped abnormally, a situation where an abnormality has occurred in an electric system, and a situation where an abnormality has occurred in a hydraulic or pneumatic system.

Here, the vehicle to which the device and method for braking are applied may not only be a car, etc. but also a heavy equipment vehicle such as a tractor, an excavator, etc. and may also be any vehicle to which the negative brake system may be applied.

Hereinafter, ways to prevent a dangerous situation caused by a sudden stopping of a vehicle due to a braking force automatically applied to a parking brake (for example, when an abnormality such as a failure of a service brake occurs while driving a vehicle) will be examined.

FIG. 12 is a view schematically illustrating a brake device in accordance with still another embodiment of the present invention. Here, differences from the embodiment illustrated in FIG. 1 will be mainly described.

Referring to FIG. 12, a brake device may further include a control unit 60 and a speed sensor 62. The control unit 60 may control applying and releasing of a braking force by a parking brake. The control unit 60 controls the valve 32 provided on the first line 30 of the parking brake to be turned on and off to control the applying and releasing of the braking force by the parking brake. Specifically, when an abnormality such as a failure of a service brake occurs while driving a vehicle, the control unit 60 turns the valve 32 provided on the first line 30 of the parking brake off (applies the braking force caused by the parking brake) and makes an interval in which the valve 32 is turned on (the braking force caused by the parking brake being released) to be included until the vehicle is stopped to prevent the vehicle from being suddenly stopped. Here, the control unit 60 may be a transmission electronic control unit (TECU).

For example, when an abnormality such as a failure of a service brake occurs while driving a vehicle, the control unit 60 may repeat turning on and off the valve 32 provided on the first line 30 of the parking brake to repeat operations of applying and releasing the braking force to and from the parking brake. Then, even when the service brake is out of order, the vehicle may be stopped by gradually decreasing the speed of the vehicle using the parking brake. That is, when turning on and off of the valve 32 is repeated, a high friction force is repeatedly generated by a repeated contact and separation between the chamber block 132 and the brake disks 110, thus gradually decreasing the speed of the vehicle. Here, a proportional valve may be used as the valve 32 provided on the first line 30 of the parking brake, for example. In this case, the valve 32 may be electronically controlled and may also be complexly controlled.

The speed sensor 62 serves to measure a speed of a vehicle and transmit the speed to the control unit 60. When an abnormality such as a failure of a service brake occurs while driving a vehicle, the control unit 60 may control a repetition frequency (or a repetition cycle) of the valve 32 being turned on and off in accordance with the speed of the vehicle received from the speed sensor 62. Here, it has been described that the separate speed sensor 62 is disposed for measuring the speed of the vehicle, but embodiments are not limited thereto, and the control unit 60 may also receive vehicle speed information from another electronic device in the vehicle. For example, the control unit 60 may receive the vehicle speed information from a navigation of the vehicle. Also, the control unit 60 may directly calculate the speed of the vehicle and control the valve 32 in accordance with the speed. For example, the control unit 60 may receive the vehicle speed information in real time from a global positioning system (GPS) mounted on the vehicle and calculate the speed of the vehicle.

The control unit 60 may increase the repetition frequency of the valve 32 being turned on and off correspondingly for a higher vehicle speed. That is, the control unit 60 may shorten the repetition cycle of the valve 32 being turned on and off correspondingly for a higher vehicle speed. In this case, a frequency of the high friction force generated due to the repetitive contact and separation between the chamber block 132 and the brake disks 110 may be increased to gradually decrease the speed of the vehicle effectively.

FIG. 13 is a view illustrating graphs comparing a parking brake control operation of the prior art and a parking brake control operation of the present invention when an emergency state of a vehicle occurs.

Referring to (a) of FIG. 13, in the prior art, when an emergency state of a vehicle occurs while a braking force of a parking brake is released, the braking force of the parking brake is applied until the vehicle stops ((a-1) of FIG. 13). In this case, the vehicle suddenly stops as the speed of the vehicle suddenly decreases ((a-2) of FIG. 13).

Referring to (b) of FIG. 13, in an embodiment of the present invention, when an emergency state of a vehicle occurs while a braking force of a parking brake is released, states in which the braking force of the parking brake is applied and released are repeated until the vehicle stops ((b-1) of FIG. 13). In this case, the speed of the vehicle slightly decreases every time the braking force of the parking brake is applied, thus enabling the vehicle to gradually stop ((b-2) of FIG. 13). The control unit 60 may control applying and releasing of the braking force of the parking brake by turning the valve 32 on and off. Here, the control unit 60 may control the valve 32 to be turned on and off using pulse width modulation (PWM).

Here, states in which the braking force of the parking brake is applied and released may be repeated in a predetermined cycle until the vehicle stops, but embodiments are not limited thereto. Also, although it has been described here that the states in which the braking force of the parking brake is applied and released are repeated, embodiments are not limited thereto, and an interval in which the braking force of the parking brake is applied and an interval in which the braking force is released (braking force release interval) need only co-exist until the vehicle stops.

The embodiments described in the specification and elements illustrated in the drawings are merely embodiments of the present invention and do not show all technical spirits of the present invention. Thus, it should be understood that various equivalents and modified embodiments that may substitute the embodiments may be present at the time of applying this application.

The invention claimed is:

1. A brake device used in a negative brake system, the brake device comprising:
    a first line of a service brake configured to supply or withdraw a pressure to apply or release a braking force of the service brake;
    a first line of a parking brake configured to supply or withdraw a pressure to apply or release a braking force of the parking brake;
    a second line of the service brake connected to a first chamber at one side of brake disks to supply a pressure to the first chamber;
    a second line of the parking brake connected to a second chamber at the other side of the brake disks to supply a pressure to the second chamber;
    a parking releasing valve configured to switch between a first state in which the first and the second lines of the service brake communicate with each other and the first and the second lines of the parking brake communicate with each other and a second state in which the first line of the service brake and the second line of the parking brake communicate with each other; and a control unit to control supply and withdrawal of a pressure in a parking brake line such that a braking force releasing interval of the parking brake exists in addition to a braking force applying interval of the parking brake when a vehicle is stopped by the parking brake when an emergency state of the vehicle occurs.

2. The brake device according to claim 1, wherein the second state is a state in which the first line of the parking brake and the second line of the service brake are disconnected therebetween.

3. The brake device according to claim 1, wherein, in the second state entered by the parking releasing valve, a parking brake is released by a pressure being supplied via the first line of the service brake and the second line of the parking brake.

4. The brake device according to claim 1, wherein the parking releasing valve includes a spool inserted into a valve hole communicating with each of the first line of the service brake, the first line of the parking brake, the second line of the service brake, and the second line of the parking brake; and the spool moves between a first position causing the first state and a second position causing the second state.

5. The brake device according to claim 4, wherein a position at which the first and the second lines of the service brake communicate with the valve hole is located more inward in the valve hole than a position at which the first and the second lines of the parking brake communicate with the valve hole.

6. The brake device according to claim 5, wherein the valve hole includes a first hole part forming a cylindrical hole and a second hole part connected to an inner end portion of the first hole part and forming a cylindrical hole having a smaller diameter than a diameter of the first hole part; and the spool includes a first cylindrical main body part having an outer surface formed in a shape corresponding to the first hole part and a second cylindrical main body part connected to an end portion of the first cylindrical main body part and having an outer surface formed in a shape corresponding to the second hole part.

7. The brake device according to claim 6, wherein, when the spool is at the first position, the first and the second lines of the service brake communicate with the valve hole at the second hole part, and the first and the second lines of the parking brake communicate with the valve hole at the first hole part.

8. The brake device according to claim 5, wherein the first position is a position where an inner end portion of the spool is located more outward in the valve hole than the position at which the first and second lines of the service brake communicate with the valve hole.

9. The brake device according to claim 5, wherein the second position is a position where the inner end portion of the spool is located more inward in the valve hole than the position at which the first line of the service brake communicates with the valve hole.

10. The brake device according to claim 5, wherein, when the spool is at the first position, the first and second lines of the service brake communicate with each other more inward in the valve hole than the inner end portion of the spool, and the first and the second lines of the parking brake communicate with each other more outward in the valve hole than the inner end portion of the spool.

11. The brake device according to claim 4, wherein the spool includes:

a spool main body forming an exterior of the spool;

a spool groove formed at the spool main body up to a predetermined position in the longitudinal direction;

a spool first pipe channel formed from an inside of the spool groove to a radial outer surface of the spool main body to communicate with the first line of the service brake when the spool is at the second position; and a spool second pipe channel formed from an inside of the spool groove to the radial outer surface of the spool main body to communicate with the second line of the parking brake when the spool is at the second position.

12. The brake device according to claim 11, wherein:

the spool first pipe channel is formed from an inner end portion of the spool groove to the radial outer surface of the spool main body; and the spool includes:

a spool ball located inside the spool groove; an elastic member having one end elastically supporting the spool ball such that the spool ball is located at the inner end portion of the spool groove; and a support part to support the other end of the elastic member.

13. The brake device according to claim 4, wherein the spool includes:

a first cylindrical main body part forming an exterior of the spool;

a second cylindrical main body part having one end connected to one end portion of the first cylindrical main body part and having a smaller diameter than the first cylindrical main body part; and an insertion end portion connected to one end portion of the second cylindrical main body part.

14. The brake device according to claim 1, wherein:

the brake device further comprises a valve provided on the first line of the parking brake; and the control unit controls braking force application of the parking brake and braking force release of the parking brake by controlling the valve to be turned on and off.

15. The brake device according to claim 14, wherein the valve is a proportional valve.

16. The brake device according to claim 1, wherein the control unit controls repeated application of the braking force of the parking brake and the release of the braking force of the parking brake.

17. The brake device according to claim 16, wherein the control unit adjusts a frequency with which the braking force application and the braking force release of the parking brake are repeated depending on a speed of the vehicle.

18. The brake device according to claim 17, wherein the control unit increases the frequency with which the braking force application and the braking force release of the parking brake are repeated with increasing speed of the vehicle.

19. A braking method used in a negative brake system, the method comprising:

a first step of being switched from a first state in which a first line of a service brake configured to supply or withdraw a pressure to apply or release a braking force of the service brake is connected to a first chamber at one side of brake disks to communicate with a second line of the service brake configured to supply a pressure to the first chamber and a first line of a parking brake configured to supply or withdraw a pressure to apply or release a braking force of the parking brake is connected to a second chamber at the other side of the brake disks to communicate with a second line of the parking brake configured to supply a pressure to the second chamber to a second state in which the first line of the service brake and the second line of the parking brake communicate with each other; and a second step in which a pressure is supplied via the first line of the service brake and the second line of the parking brake to release the braking force of the parking brake.

20. The method according to claim 19, wherein the second state is a state in which the first line of the parking brake and the second line of the service brake are disconnected therebetween.

21. The method according to claim 19, wherein:

in the first step, the switching from the first state to the second state is performed by a parking releasing valve connected to the first line of the service brake, the second line of the service brake, the first line of the parking brake, and the second line of the parking brake;

the parking releasing valve includes a spool inserted into a valve hole that communicates with each of the first line of the service brake, the first line of the parking brake, the second line of the service brake, and the second line of the parking brake; and the spool moves between a first position causing the first state and a second position causing the second state.

22. The method according to claim 21, wherein the first position is a position where an inner end portion of the spool is located more outward in the valve hole than the position at which the first and the second lines of the service brake communicate with the valve hole.

23. The method according to claim 21, wherein the second position is a position where the inner end portion of the spool is located more inward in the valve hole than the position at which the first line of the service brake communicates with the valve hole.

24. The method according to claim 21, wherein, when the spool is at the first position, the first and the second lines of the service brake communicate with each other more inward in the valve hole than the inner end portion of the spool, and the first and the second lines of the parking brake communicate with each other more outward in the valve hole than the inner end portion of the spool.

25. The method according to claim 19, wherein:

before the first step, the method further comprises detecting an occurrence of an emergency state of a vehicle; and stopping the vehicle using a parking brake when the occurrence of an emergency state of the vehicle is detected, and, in the stopping of the vehicle, a braking force releasing interval of the parking brake in addition to a braking force applying interval of the parking brake exist while the vehicle is stopping.

26. The method according to claim 25, wherein, in the stopping of the vehicle, the braking force application by the parking brake and the braking force release by the parking brake are repeated.

27. The method according to claim 26, wherein, in the stopping of the vehicle, a frequency with which the braking force application and the braking force release of the parking brake are repeated is adjusted depending on a speed of the vehicle.

28. The method according to claim 27, wherein, in the stopping of the vehicle, the frequency with which the braking force application and the braking force release of the parking brake are repeated increases with increasing speed of the vehicle.

29. A vehicle to which a negative brake system is applied, the vehicle releasing a braking force applied by a parking brake in an emergency state using a brake device of claim 1.

30. A vehicle to which a negative brake system is applied, the vehicle releasing a braking force applied by a parking brake in an emergency state using a braking method of claim 19.

* * * * *